United States Patent
Petot et al.

(10) Patent No.: US 11,987,152 B2
(45) Date of Patent: May 21, 2024

(54) SLIDE FOR SEAT

(71) Applicant: FAURECIA Sièges d'Automobile, Nanterre (FR)

(72) Inventors: Guillaume Petot, Landisacq (FR); Fabrice Petit, St Georges des Groseillers (FR); Wang Chen, Mondeville (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 422 days.

(21) Appl. No.: 17/487,592

(22) Filed: Sep. 28, 2021

(65) Prior Publication Data

US 2022/0097570 A1 Mar. 31, 2022

(30) Foreign Application Priority Data

Sep. 30, 2020 (FR) ..................... 20 10009

(51) Int. Cl.
*B60N 2/07* (2006.01)
*B60N 2/02* (2006.01)
*B60R 21/015* (2006.01)

(52) U.S. Cl.
CPC ......... *B60N 2/0705* (2013.01); *B60N 2/0272* (2023.08); *B60N 2/0715* (2013.01); *B60N 2/0735* (2013.01); *B60R 21/01554* (2014.10)

(58) Field of Classification Search
None
See application file for complete search history.

(56) References Cited

U.S. PATENT DOCUMENTS

| | | | |
|---|---|---|---|
| 6,351,994 B1 | 3/2002 | Pinkos | |
| 10,011,241 B2 * | 7/2018 | Lanter | B60R 21/01 |
| 10,300,813 B2 | 5/2019 | Kim | |
| 2002/0125396 A1 * | 9/2002 | Kume | B60N 2/0715 |
| | | | 248/429 |
| 2011/0043010 A1 * | 2/2011 | Diemer | B60N 2/07 |
| | | | 297/217.3 |
| 2011/0101970 A1 * | 5/2011 | Lanter | B60R 21/01554 |
| | | | 324/207.25 |
| 2018/0148011 A1 * | 5/2018 | Zaugg | G01D 5/145 |
| 2022/0198889 A1 * | 6/2022 | Meinert | G08B 5/36 |

FOREIGN PATENT DOCUMENTS

| | | |
|---|---|---|
| DE | 102016001564 A1 | 8/2017 |
| DE | 102017100182 A1 | 1/2018 |
| DE | 102017206994 B4 | 1/2019 |
| EP | 1270314 B1 | 1/2003 |
| EP | 1560728 B1 | 8/2005 |
| WO | 2020207835 A1 | 10/2020 |

* cited by examiner

*Primary Examiner* — David E Allred
(74) *Attorney, Agent, or Firm* — Barnes & Thornburg LLP

(57) ABSTRACT

A slide for a vehicle seat, comprising a female rail having at least one vertical side wall, a male rail also having at least one vertical side wall, mounted to slide relative to the female rail, the female rail surrounding the male rail with the vertical side wall of the female rail facing the vertical side wall of the male rail, a position sensor comprising a means for measuring the surrounding magnetic field fixed to the vertical side wall of the male rail by means of a spring member, and arranged between the substantially planar wall of the male rail and the substantially planar wall of the female rail and oriented towards the substantially planar wall of the female rail.

15 Claims, 6 Drawing Sheets

FIG. 4

SLIDE FOR SEAT

PRIORITY CLAIM

This application claims priority to French Patent Application FR 20 10009, filed Sep. 30, 2020, which is expressly incorporated by reference herein.

BACKGROUND

The present disclosure relates to a slide, in particular for a motor vehicle seat, and to a vehicle seat comprising such a slide. More particularly, the present disclosure relates to a slide for a vehicle seat comprising a female rail and a male rail which is mounted to slide relative to each other in a longitudinal direction of the slide, the female rail surrounding the male rail in a transverse direction of the slide.

SUMMARY

According to the present disclosure, a slide for a vehicle seat comprises a female rail and a male rail which are mounted to slide relative to each other in a longitudinal direction of the slide, the female rail surrounding the male rail in a transverse direction of the slide, and with a position sensor configured to determine the position of the male rail relative to the female rail that is of simplified design and of reduced footprint and production cost.

In illustrative embodiments, a slide for a vehicle seat, comprises:
- a female rail having at least one vertical side wall,
- a male rail also having at least one vertical side wall, mounted to slide relative to the female rail in the longitudinal direction of the slide, the female rail surrounding the male rail in the transverse direction of the slide, with the vertical side wall of the female rail facing the vertical side wall of the male rail,
- a position sensor configured to determine the position of the male rail relative to the female rail, at least in the longitudinal direction of the slide.

In illustrative embodiments, the position sensor comprises a means for measuring the surrounding magnetic field fixed to the vertical side wall of the male rail and arranged between the substantially planar wall of the male rail and the substantially planar wall of the female rail and oriented towards the substantially planar wall of the female rail.

In illustrative embodiments, the means for measuring the magnetic field is fixed to the vertical side wall of the male rail by means of a spring member configured to urge the position of the means for measuring the magnetic field towards the vertical side wall of the female rail in the transverse direction of the slide, in order to maintain a constant distance between the means for measuring the magnetic field and the vertical side wall of the female rail in the transverse direction of the slide.

In illustrative embodiments, the means for measuring the magnetic field is housed inside a housing that is integral with the spring member.

In illustrative embodiments, the spring member is configured to keep the housing pressed against the vertical side wall of the female rail, substantially in the transverse direction of the slide.

In illustrative embodiments, the spring member comprises at least one elastic tab extending from the housing, the at least one elastic tab being configured to urge the position of the housing towards the vertical side wall of the female rail in the transverse direction of the slide, in order to maintain a constant distance between the housing and the vertical side wall of the female rail in the transverse direction of the slide.

In illustrative embodiments, the at least one elastic tab is formed as one piece and integral with the housing.

In illustrative embodiments, the at least one elastic tab is part of an attachment piece enabling detachment of the housing.

In illustrative embodiments, the attachment piece comprises a receiving portion for the housing, the at least one elastic tab extending from the receiving portion.

In illustrative embodiments, the spring member comprises two elastic tabs, in particular identical, extending one on either side of the housing, and in particular symmetrically with respect to the housing.

In illustrative embodiments, at least one attachment tab, in particular each attachment tab, has a substantially planar attachment portion abutting against the vertical side wall of the male rail.

In illustrative embodiments, at least one attachment tab, in particular each attachment tab, has a fold interposed between the attachment portion and the housing, and distanced from the vertical side wall of the male rail substantially in the transverse direction of the slide.

In illustrative embodiments, the substantially planar wall of the male rail has a through-opening, at least partially receiving the means for measuring the magnetic field which protrudes towards the vertical side wall of the female rail from the vertical side wall of the male rail.

In illustrative embodiments, the vertical side wall of the male rail has an outer face oriented towards the vertical side wall of the female rail, substantially in the transverse direction of the slide, and an inner face oriented away from the side wall of the female rail, substantially in the transverse direction of the slide, the spring member being fixed to the inner face of the vertical side wall of the male rail.

In illustrative embodiments, the vertical side wall of the female section piece is called the first vertical side wall, the female section piece comprising a second vertical side wall substantially parallel to the first vertical side wall, the first vertical side wall and the second vertical side wall surrounding the male section piece in the transverse direction of the slide.

In illustrative embodiments, a vehicle seat comprises
- a slide according to the present disclosure,
- a seating portion, the male section piece of the slide being connected to the seating portion of the seat, the seating portion having a central longitudinal axis passing substantially through the center of the seat in the transverse direction of the slide.

In illustrative embodiments, the first vertical side wall of the female rail is closer to the central longitudinal axis of the seating portion in the transverse direction of the slide than the second vertical side wall of the female rail.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
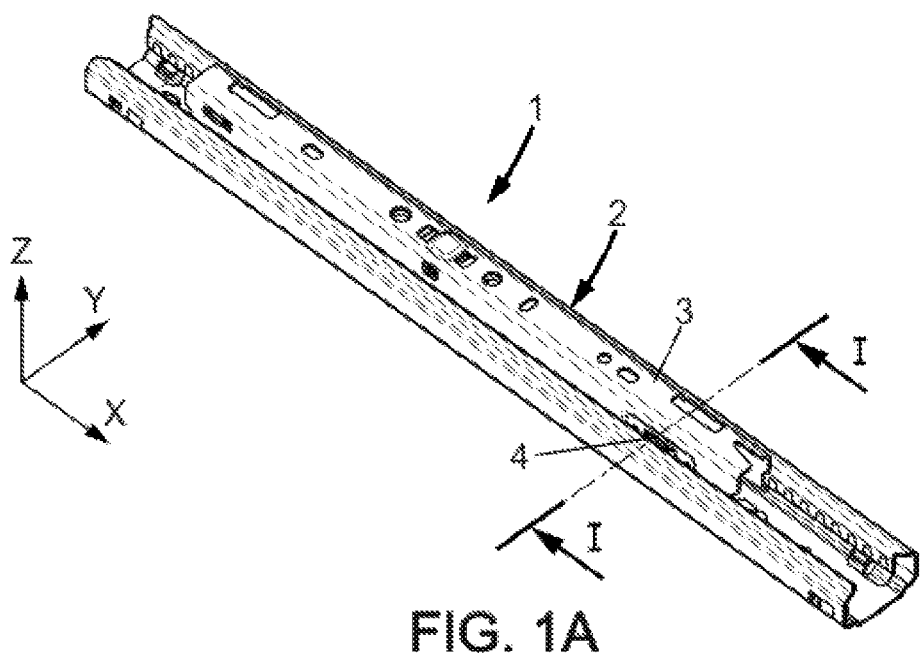
FIG. 1A is a perspective view of a slide according to one embodiment of the present disclosure.

Throughout this Application:

the longitudinal direction X of the slide corresponds to the direction in which the male section piece slides relative to the female section piece, as can be seen in the figures, the vertical direction Z of the slide corresponds to the direction perpendicular to the longitudinal direction X, substantially perpendicular to the plane of the vehicle floor to which the slide is intended to be fixed, as can be seen in the figures, the transverse direction Y of the slide corresponds to the direction perpendicular to the longitudinal direction X and to the vertical direction Z of the slide, as can be seen in the figures, the longitudinal X, vertical Z, and transverse Y directions of the seat correspond to the longitudinal X, vertical Z, and transverse Y directions of the slide, as can be seen in the figures.

An axis is defined as a straight line in a determined direction of the slide or of the seat. For example, a longitudinal axis is an axis along the longitudinal direction X of the slide or of the seat.

Also, front and rear are understood relative to the longitudinal direction X of the slide, respectively of the seat, with an orientation for the seat that is from the rear edge of the seat, to which a backrest is generally hinged, towards the front edge of the seat.

Similarly, upper and lower are understood relative to the vertical direction Z of the slide, respectively of the seat, with an orientation that is from the slide section piece intended to be fixed to the vehicle floor towards the section piece intended to be fixed to the seating portion of the seat.

Finally, throughout this application, substantially longitudinal, transverse, or vertical is understood to mean an orientation that is at an angle of less than 30° relative to the longitudinal direction, the vertical direction, or the transverse direction, which can advantageously be zero.

Similarly, substantially parallel is understood to mean an orientation that is at an angle of less than 30° relative to a given element, which can advantageously be zero.

The present disclosure relates to a slide 1 for a vehicle seat, comprising:

a female rail 2 having at least one vertical side wall 21, a male rail 3 also having at least one vertical side wall 31, mounted to slide relative to the female rail 2 in the longitudinal direction X of the slide 1, the female rail 2 surrounding the male rail 3 in the transverse direction Y of the slide 1, with the vertical side wall 21 of the female rail 2 facing the vertical side wall 31 of the male rail 3, a position sensor 4 configured to determine the position of the male rail 3 relative to the female rail 2, at least along the longitudinal direction X of the slide 1.

Advantageously, the position sensor 4 comprises a means for measuring the surrounding magnetic field 41, fixed to the vertical side wall 31 of the male rail 3 and arranged between the substantially planar wall 31 of the male rail 3 and the substantially planar wall 21 of the female rail 2 and oriented towards the substantially planar wall 21 of the female rail 2.

Advantageously, the means for measuring the magnetic field 41 is fixed to the vertical side wall 31 of the male rail 3 by means of a spring member 42, configured so as to urge the position of the means for measuring the magnetic field 41 towards the vertical side wall 21 of the female rail 2 in the transverse direction Y of the slide 1, in order to maintain a constant distance E41 between the means for measuring the magnetic field 41 and the vertical side wall 21 of the female rail 2 in the transverse direction Y of the slide 1.

Figure 1B:
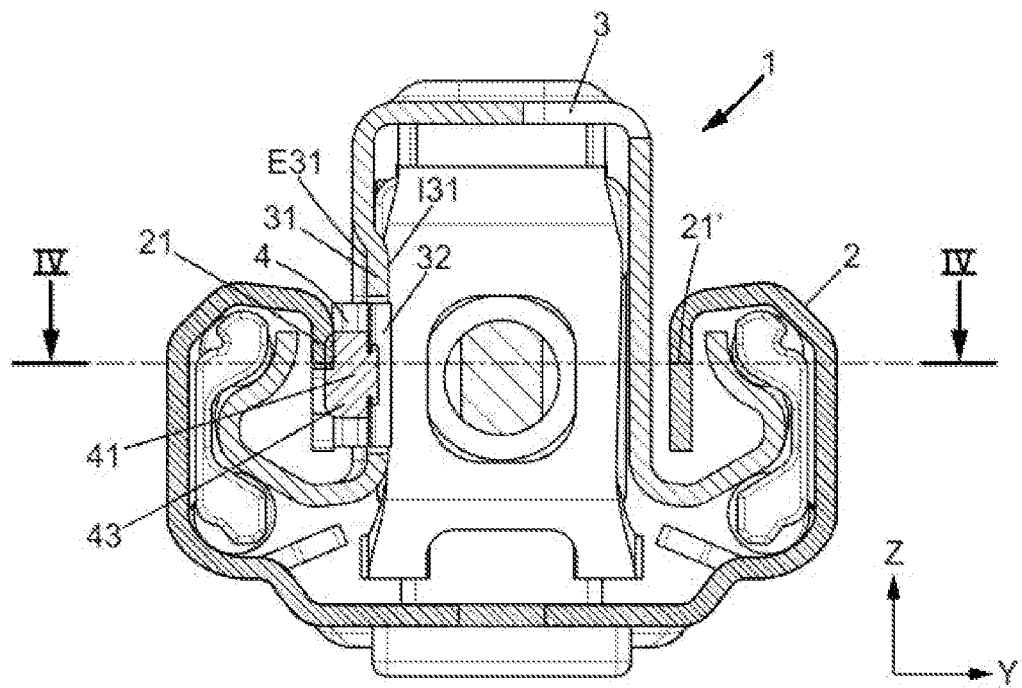
FIG. 1B is a section view of the slide of FIG. 1A along line I-I of FIG. 1A.
Figure 2:
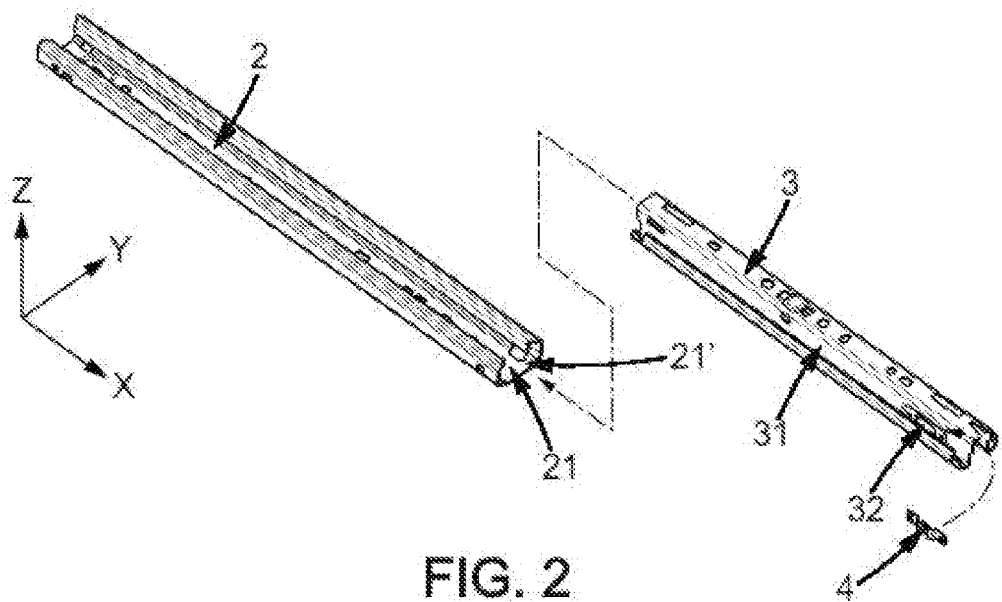
FIG. 2 is an exploded view of the slide of FIG. 1A.

Thus, the means for measuring the magnetic field 41 of the position sensor 4 is entirely contained within the volume of the slide 1 between the vertical side wall 31 of the male section piece 3 and the side wall of the female section piece 2, as is particularly visible in FIGS. 1A and 1B.

The space occupied by the slide 1 according to the present disclosure is thus significantly reduced compared to comparative slides, because it does not include any element protruding outwardly from the male section piece 3 or from the female section piece 2, particularly for the position sensor 4, and this also simplifies its design and reduces its production cost.

In addition, as the position sensor 4, and in particular the means for measuring the magnetic field 41, extends within the volume of the slide 1, there is no risk of its being struck by an external element, such as a user's foot for example, and being damaged and therefore no longer serving to fulfill its function and in particular to provide for the safety of an occupant of a vehicle seat 10 fixed to the floor of a vehicle by means of the slide 1 according to the present disclosure.

The female rail 2 in fact can advantageously be fixed to the floor of a vehicle while the male rail 3 can be connected to a seat 10, and in particular to the seating portion 11 of a seat 10.

For this purpose, the male rail 3 can be positioned essentially above the female rail 2 in the vertical direction Z of the slide 1.

The slide 1 can be arranged so that the movement of the male rail 3 relative to the female rail 2 in the longitudinal direction X of the slide 1 is driven manually and/or by means of a driving means.

The female rail 2 can advantageously be made essentially of a metal material, and the same may be true for the male rail 3.

Figure 4:
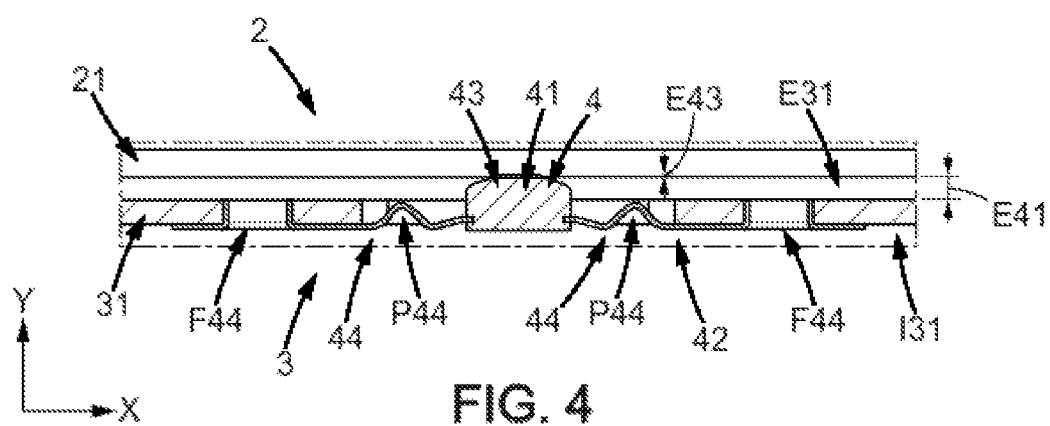
FIG. 4 is a section view of the slide of FIG. 1A along line IV-IV of FIG. 1B.

In addition, and as is more particularly visible in FIG. 4, there is generally an empty space, in the transverse direction Y of the slide 1, between the vertical side wall 31 of the male rail 3 and the vertical side wall 21 of the female rail 2, of which the dimension in the transverse direction Y of the slide 1 may be non-constant. The use of the spring member 42 makes it possible to ensure that the means for measuring the magnetic field 41 is always located at the desired distance from the vertical side wall 21 of the female rail 2, and in particular as close as possible to it, so as to measure the magnetic field of the female rail 2 in a reliable manner and be able to deduce therefrom the position of the male rail 3 relative to the female rail 2 in the longitudinal direction X of the slide 1.

As a result, it is possible to use a means for measuring the magnetic field 41, and therefore a position sensor 4, of reduced dimensions compared to those used in comparative slides.

As can be seen in FIGS. 1A, 1B, 2, 3, and 4, the vertical side wall 21 of the female rail 2 can extend substantially in the longitudinal direction X and in the vertical direction Z of the slide 1. Similarly, the side wall 31 of the male rail 3 can also extend substantially in the longitudinal direction X and in the vertical direction Z of the slide 1.

Positioning the means for measuring the magnetic field 41 on the vertical side wall 31 of the male rail 3 is particularly advantageous, in that such a wall 31 is generally close to the vertical side wall 21 of the female rail 2. As a result, the means for measuring the magnetic field 41 is as close as possible to the vertical side wall 21 of the female rail 2, and can easily measure the magnetic field or its variation in the vicinity of the female rail 2, without any interfering element able to become lodged between the vertical side wall 31 of the male rail 3 and the vertical side wall 21 of the female rail 2. In addition, this also makes it possible to use a means for measuring the magnetic field that is of reduced dimensions, in order to limit the space occupied by the position sensor 4 and reduce the production cost of the slide 1.

Figure 5:
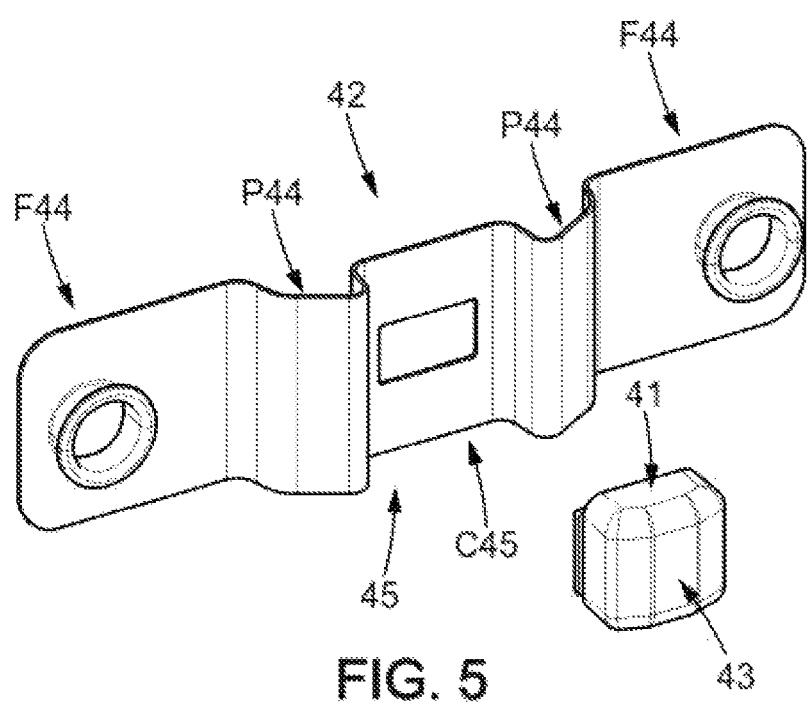
FIG. 5 is an exploded perspective view of the position sensor of the slide of FIG. 1A.

According to one embodiment, and as is more particularly visible in FIG. 5, the means for measuring the magnetic field 41 is housed inside a housing 43 that is integral with the spring member 42.

The housing 43 can advantageously be made, at least partially, of thermoplastic material.

According to one embodiment, the spring member 42 is configured so as to keep the housing 43 pressed against the vertical side wall 21 of the female rail 2, substantially in the transverse direction Y of the slide 1.

Due to this advantageous arrangement of the present disclosure, the means for measuring the magnetic field 41 is positioned as close as possible to the vertical side wall 21 of the female rail 2, being separated therefrom only by the thickness of the wall of the housing 43.

Figure 7A:
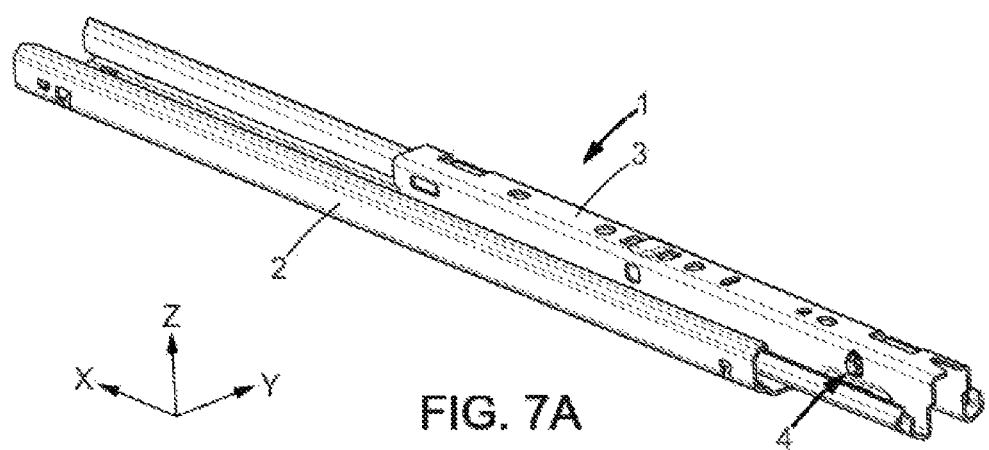
FIG. 7A is a perspective view of a slide according to one embodiment of the present disclosure.
Figure 7B:
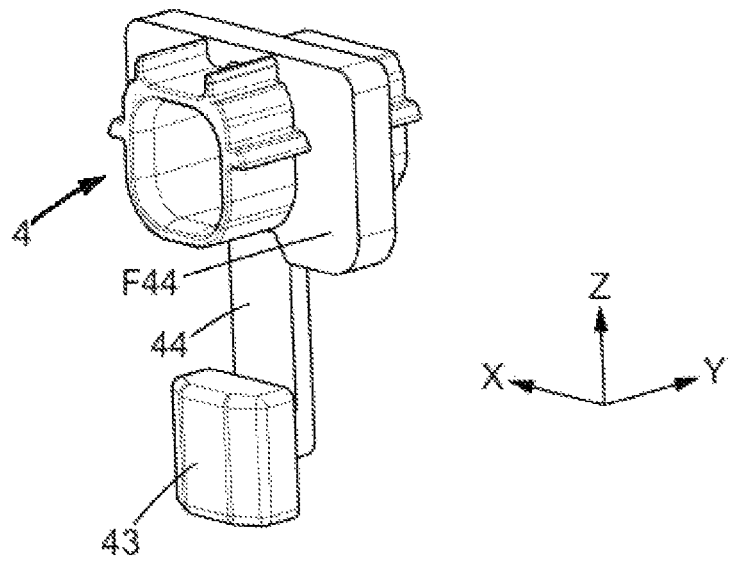
FIG. 7B is a perspective view of the position sensor of the slide of FIG. 7A.

According to one embodiment, and as can be seen in FIGS. 4, 5, and 7A, the spring member 42 comprises at least one elastic tab 44, extending from the housing 43, in particular substantially in the longitudinal direction X of the slide 1, as can be seen in FIGS. 4 and 5, or in the vertical direction Z of the slide 1, as can be seen in FIGS. 7A and 7B, the at least one elastic tab 44 being configured so as to urge the position of the housing 43 towards the vertical side wall 21 of the female rail 2 in the transverse direction Y of the slide 1, in order to maintain a constant distance E43, and in particular zero, between the housing 43 and the vertical side wall 21 of the female rail 2 in the transverse direction Y of the slide 1.

The spring member 42 therefore has a simple design and a low production cost, with reduced dimensions in the transverse direction Y of the slide 1, to enable it to be interposed between the vertical side wall 21 of the female rail 2 and the vertical side wall 31 of the male rail 3.

Figure 3:
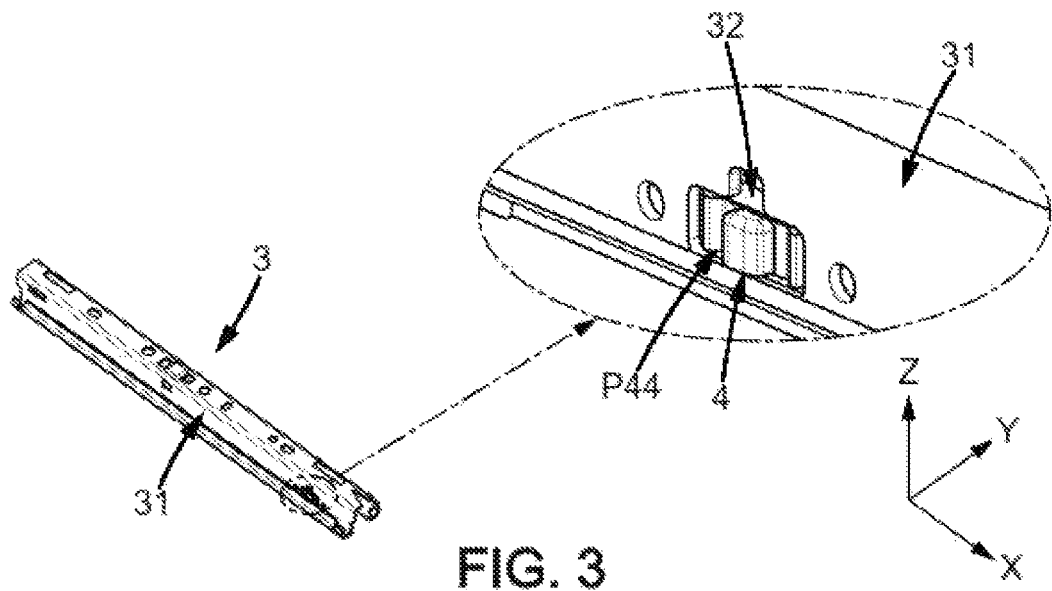
FIG. 3 is a perspective view of the male rail of the slide of FIG. 1A with a detail view of the position sensor.

Advantageously, as can be seen in FIGS. 3 and 4, the spring member 42 can be fixed to the vertical side wall 31 of the male rail 3 at at least one elastic tab 44, and preferably at each of the elastic tabs 44.

The elastic tabs 44 can advantageously be made of an elastic material, such as metal for example.

According to one embodiment, as can be seen in FIG. 7B, the at least one elastic tab 44 is made as one piece and integral with the housing 43.

This advantageous arrangement of the present disclosure makes it possible to reduce the manufacturing time of the spring member 42 of the slide 1 according to the present disclosure, and to prevent the housing 43 and therefore the means for measuring the magnetic field 41 from being easily separated from the spring member 42.

According to an alternative embodiment, as can be seen more particularly in FIG. 5, the at least one elastic tab 44 is part of an attachment piece 45 enabling detachment of the housing 43.

This advantageous arrangement of the present disclosure facilitates maintenance of the position sensor 4, in that, in the event of failure of the means for measuring the magnetic field 41, the latter can be detached from the attachment piece 45 for repair or replacement, and without needing to separate the attachment piece 45 from the male rail 3.

According to one embodiment, as can be seen in FIGS. 4 and 5, the attachment piece 45 comprises a central portion C45 for receiving the housing 43, the at least one elastic tab 44 extending from the central portion C45, and in particular substantially in the longitudinal direction X of the slide 1, as can be seen in FIGS. 4 and 5, or in its vertical direction Z, as can be seen in FIGS. 7A and 7B.

In the case where the spring member 42 comprises two elastic tabs 44, as can be seen in FIG. 5, the elastic tabs 44 can extend one on either side of the central portion C45, in particular symmetrically.

According to one embodiment, the spring member 42 comprises two elastic tabs 44, in particular identical, extending one on either side of the housing 43, in particular substantially in the longitudinal direction X of the slide 1, as can be seen in FIGS. 4 and 5, and in particular symmetrically with respect to the housing 43.

According to one embodiment, as can be seen in FIGS. 5 and 7B, at least one attachment tab 44, in particular each attachment tab 44, has a substantially planar attachment portion F44 abutting against the vertical side wall 31 of the male rail 3.

The attachment portion F44 may optionally receive an attachment means (not shown) for attachment to the vertical side wall 31 of the male rail 3, for example a rivet.

According to one embodiment, as can be seen in FIG. 5, at least one attachment tab 44, in particular each attachment tab 44, has a fold P44 interposed between the attachment portion F44 and the housing 43, and in particular substantially in the longitudinal direction X of the slide 1, and distanced from the vertical side wall 31 of the male rail 3 substantially in the transverse direction Y of the slide 1.

Such a design of the attachment tab(s) 44 of the spring member 42 is particularly simple and makes it possible to facilitate the manufacture of the spring member 42 and reduce its production cost. In particular, the spring member 42 can easily be entirely produced from a metal sheet with a limited number of forging operations.

Alternatively, the spring member 42 can easily be made of thermoplastic material by injection molding.

According to one embodiment and as can be seen in FIGS. 3 and 4, the substantially planar wall 31 of the male rail 3 has a through-opening 32, at least partially receiving the means for measuring the magnetic field 41 which protrudes towards the vertical side wall 21 of the female rail 2 from the vertical side wall 31 of the male rail 3.

This advantageous arrangement of the present disclosure facilitates the attachment of the means for measuring the magnetic field 41 to the male rail 3, and in particular when there is limited empty space between the vertical side wall 31 of the male rail 3 and the vertical side wall 21 of the female rail 2 in the transverse direction Y of the slide 1.

In addition, the means for measuring the magnetic field 41 is thus housed essentially within the volume of the vertical side wall 31 of the male rail 3, which makes it possible to minimize the space occupied by the position sensor 4, in particular in the transverse direction Y of the slide 1.

The through-opening 32 may have a shape substantially corresponding to the shape of the means for measuring the magnetic field 41, or even to that of the housing 43.

Advantageously, and as can be seen in FIG. 3, the fold or folds P44 of the elastic tabs 44 can also extend through the through-opening 32, which has an appropriate shape for this purpose, in order to allow the elastic deformation of the or of each of the elastic tabs 44 at the fold P44.

According to one embodiment, the vertical side wall 31 of the male rail 3 has an outer face E31 oriented towards the vertical side wall 21 of the female rail 2, substantially in the transverse direction Y of the slide 1, and an inner face I31 oriented away from the side wall 21 of the female rail 2, substantially in the transverse direction Y of the slide 1, the spring member 42 being fixed to the inner face I31 of the vertical side wall 31 of the male rail 3.

Thus, due to this advantageous arrangement of the present disclosure, the spring member 42 can essentially be located inside the volume of the male rail 3, so that it is protected and there is no risk of its being struck by an external element which could cause its separation from the male rail 3.

In particular, the or each of the attachment portions F44 or even all of the or each of the elastic tabs 44 may be located inside the volume of the male rail 3, so that they are protected and there is no risk of their being struck by an external element which could cause their separation from the male rail 3.

According to one embodiment, the vertical side wall 21 of the female section piece 2 is called the first vertical side wall 21, the female section piece 2 comprising a second vertical side wall 21' substantially parallel to the first vertical side wall 21, the first vertical side wall 21 and the second vertical side wall 21' surrounding the male section piece 3 in the transverse direction Y of the slide 1.

In particular, the first vertical side wall 21 may be arranged to be located closer than the second vertical side wall 21', to a central longitudinal axis X1 of the seating portion 11 of a vehicle seat 10 to which the slide 1 is connected, advantageously the male section piece 3 of the slide 1. Thus, the position sensor 4, and in particular the means for measuring the magnetic field 41, can be positioned under the seating portion 11 of the seat 10 in the vertical direction Z of the slide 1, and offset from the lateral edge of the seating portion 11 in the transverse direction Y of the slide 1, in order to be protected as much as possible from the risk of being struck by an external element which could damage it, such as a foot of a user of the vehicle for example.

Figure 6:
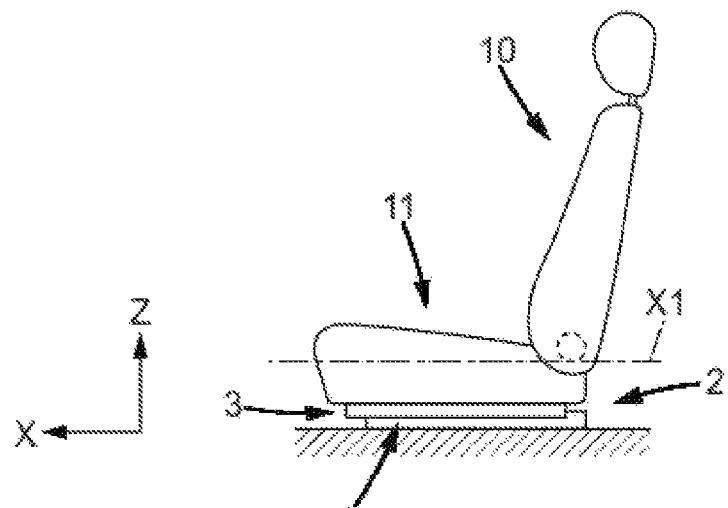
FIG. 6 is a schematic side view of a seat according to one embodiment of the present disclosure.

The present disclosure also relates to a seat 10 for a vehicle, and in particular for a motor vehicle, as can be seen in FIG. 6, comprising:
 a slide 1 according to one of the embodiments described above, and
 a seating portion 11, the male section piece 3 of the slide 1 being connected to the seating portion 11 of the seat 10, the seating portion 11 having a central longitudinal axis X1 passing substantially through the center of the seating portion 11 in the transverse direction Y of the slide 1.

All of the arrangements described above relating to a vehicle seat 10 to which a slide 1 according to the present disclosure is attached, apply to the vehicle seat 10 according to the present disclosure.

According to one embodiment, wherein the vertical side wall 21 of the female section piece 2 is called the first vertical side wall 21, the female section piece 2 comprising a second vertical side wall 21' substantially parallel to the first vertical side wall 21, the first vertical side wall 21 and the second vertical side wall 21' surrounding the male section piece 3 in the transverse direction Y of the slide 1, the first vertical side wall 21 of the female rail 2 is closer to the central longitudinal axis X1 of the seating portion 11 of the seat 1 in the transverse direction Y of the slide 1 than the second vertical side wall 21' of the female rail 2.

Due to this advantageous arrangement of the present disclosure, and as explained above, the position sensor 4, and in particular the means for measuring the magnetic field 41, can be positioned under the seating portion 11 of the seat 10 according to the vertical direction Z of the slide 1, and offset from the lateral edge of the seating portion 11 according to the transverse direction Y of the slide 1, in order to be as protected as possible from the risk of being struck by an external element which could damage it, such as the foot of a user of the vehicle for example.

Of course, other embodiments are conceivable to those skilled in the art, without departing from the scope of the present disclosure defined by the claims below.

A comparative slide includes a female rail, and a male rail mounted to slide relative to the female rail in the longitudinal direction of the slide, the female rail surrounding the male rail in the transverse direction of the slide. The comparative slide also has a position sensor configured to determine the position of the female rail relative to the male rail, comprising a substantially L-shaped protuberance provided on an outer side wall of the female rail, projecting outwardly from the female rail, as well as a magnetic field sensor provided on an outer side wall of the male rail, projecting outwardly from the male rail and intended to receive the protuberance internally. The magnetic field or its variation measured by the magnetic field sensor allows knowing the position of the female rail relative to the male rail in the longitudinal direction of the slide, and therefore of the seat intended to be fixed to the floor of a vehicle via the slide, and in particular so as to be able to manage the deployment of a passenger restraint system, for example such as an airbag.

Such a comparative slide has several disadvantages.

First, the design of the position sensor, with the fixed L-shaped protuberance projecting outwardly on the female rail, significantly increases the space occupied by the slide, particularly in its transverse direction.

In addition, the position sensor used in such a slide has a significant volume in order to be able to measure the magnetic field or its variations during the sliding of the male rail relative to the female rail, and therefore also significantly increases the space occupied by the slide.

Also, such a design of the position sensor, in particular with the need for the fixed L-shaped protuberance projecting outwardly on the female rail of the slide, complicates the design of the slide and significantly increases its production cost.

Lastly, as the position sensor has elements projecting outwardly from the female rail, there is the risk of damage by other elements of the vehicle to which the slide is fixed, for example such as the feet of a vehicle occupant, and it may no longer be able to function, which can pose a strong threat to the safety of occupants of a vehicle in which a seat is fixed to the floor via the slide.

The slide of the present disclosure improves the situation.

A slide for a vehicle seat, comprises a female rail and a male rail which are mounted to slide relative to each other in a longitudinal direction of the slide, the female rail surrounding the male rail in a transverse direction of the slide, and with a position sensor configured to determine the position of the male rail relative to the female rail that is of simplified design and of reduced footprint and production cost. Such a slide which improves safety for the occupants of a vehicle.

Thus, the present disclosure relates to a slide for a vehicle seat, comprising:
- a female rail having at least one vertical side wall,
- a male rail also having at least one vertical side wall, mounted to slide relative to the female rail in the longitudinal direction of the slide, the female rail surrounding the male rail in the transverse direction of the slide, with the vertical side wall of the female rail facing the vertical side wall of the male rail,
- a position sensor configured to determine the position of the male rail relative to the female rail, at least in the longitudinal direction of the slide.

According to the present disclosure, the position sensor comprises a means for measuring the surrounding magnetic field fixed to the vertical side wall of the male rail and arranged between the substantially planar wall of the male rail and the substantially planar wall of the female rail and oriented towards the substantially planar wall of the female rail.

According to the present disclosure, the means for measuring the magnetic field is fixed to the vertical side wall of the male rail by means of a spring member configured to urge the position of the means for measuring the magnetic field towards the vertical side wall of the female rail in the transverse direction of the slide, in order to maintain a constant distance between the means for measuring the magnetic field and the vertical side wall of the female rail in the transverse direction of the slide.

The features set forth in the following paragraphs may optionally be implemented. They may be implemented independently of each other or in combination with each other:
- the means for measuring the magnetic field is housed inside a housing that is integral with the spring member;
- the spring member is configured to keep the housing pressed against the vertical side wall of the female rail, substantially in the transverse direction of the slide;
- the spring member comprises at least one elastic tab extending from the housing, the at least one elastic tab being configured to urge the position of the housing towards the vertical side wall of the female rail in the transverse direction of the slide, in order to maintain a constant distance between the housing and the vertical side wall of the female rail in the transverse direction of the slide;
- the at least one elastic tab is formed as one piece and integral with the housing;
- the at least one elastic tab is part of an attachment piece enabling detachment of the housing;
- the attachment piece comprises a receiving portion for the housing, the at least one elastic tab extending from the receiving portion;
- the spring member comprises two elastic tabs, in particular identical, extending one on either side of the housing, and in particular symmetrically with respect to the housing;
- at least one attachment tab, in particular each attachment tab, has a substantially planar attachment portion abutting against the vertical side wall of the male rail;
- at least one attachment tab, in particular each attachment tab, has a fold interposed between the attachment portion and the housing, and distanced from the vertical side wall of the male rail substantially in the transverse direction of the slide;
- the substantially planar wall of the male rail has a through-opening, at least partially receiving the means for measuring the magnetic field which protrudes towards the vertical side wall of the female rail from the vertical side wall of the male rail;
- the vertical side wall of the male rail has an outer face oriented towards the vertical side wall of the female rail, substantially in the transverse direction of the slide, and an inner face oriented away from the side wall of the female rail, substantially in the transverse direction of the slide, the spring member being fixed to the inner face of the vertical side wall of the male rail;
- the vertical side wall of the female section piece is called the first vertical side wall, the female section piece comprising a second vertical side wall substantially parallel to the first vertical side wall, the first vertical side wall and the second vertical side wall surrounding the male section piece in the transverse direction of the slide.

The present disclosure also relates to a vehicle seat comprising:
- a slide according to the present disclosure,
- a seating portion, the male section piece of the slide being connected to the seating portion of the seat, the seating portion having a central longitudinal axis passing substantially through the center of the seat in the transverse direction of the slide.

According to one embodiment, the first vertical side wall of the female rail is closer to the central longitudinal axis of the seating portion in the transverse direction of the slide than the second vertical side wall of the female rail.

A slide (1) for a vehicle seat, comprising:
- a female rail (2) having at least one vertical side wall (21),
- a male rail (3) also having at least one vertical side wall (31), mounted to slide relative to the female rail (2), the female rail (2) surrounding the male rail (3) with the vertical side wall (21) of the female rail (2) facing the vertical side wall (31) of the male rail (3),
- a position sensor (4) comprising a means for measuring the surrounding magnetic field (41) fixed to the vertical side wall (31) of the male rail (3) by means of a spring member (42), and arranged between the substantially planar wall (31) of the male rail (3) and the substantially planar wall (21) of the female rail (2) and oriented towards the substantially planar wall (21) of the female rail (2).

The following numbered clauses include embodiments that are contemplated and non-limiting:

Clause 1. A slide (1) for a vehicle seat, comprising:
a female rail (2) having at least one vertical side wall (21),
a male rail (3) also having at least one vertical side wall (31), mounted to slide relative to the female rail (2) in the longitudinal direction (X) of the slide (1), the female rail (2) surrounding the male rail (3) in the transverse direction (Y) of the slide (1), with the vertical side wall (21) of the female rail (2) facing the vertical side wall (31) of the male rail (3),
a position sensor (4) configured to determine the position of the male rail (3) relative to the female rail (2), at least in the longitudinal direction (X) of the slide (1),
the position sensor (4) comprising a means for measuring the surrounding magnetic field (41) fixed to the vertical side wall (31) of the male rail (3) and arranged between the substantially planar wall (31) of the male rail (3) and the substantially planar wall (21) of the female rail (2) and oriented towards the substantially planar wall (21) of the female rail (2),
the means for measuring the magnetic field (41) being fixed to the vertical side wall (31) of the male rail (3) by means of a spring member (42) configured to urge the position of the means for measuring the magnetic field (41) towards the vertical side wall (21) of the female rail (2) in the transverse direction (Y) of the slide (1), in order to maintain a constant distance (E41) between the means for measuring the magnetic field (41) and the vertical side wall (21) of the female rail (2) in the transverse direction (Y) of the slide (1).

Clause 2. The slide (1) according to clause 1, wherein the means for measuring the magnetic field (41) is housed inside a housing (43) that is integral with the spring member (42).

Clause 3. The slide (1) according to clause 2, wherein the spring member (42) is configured to keep the housing (43) pressed against the vertical side wall (21) of the female rail (2), substantially in the transverse direction (Y) of the slide (1).

Clause 4. The slide (1) according to clause 2 or 3, wherein the spring member (42) comprises at least one elastic tab (44) extending from the housing (43), the at least one elastic tab (44) being configured to urge the position of the housing (43) towards the vertical side wall (21) of the female rail (2) in the transverse direction (Y) of the slide (1), in order to maintain a constant distance (E43) between the housing (43) and the vertical side wall (21) of the female rail (2) in the transverse direction (Y) of the slide (1).

Clause 5. The slide (1) according to clause 4, wherein the at least one elastic tab (44) is formed as one piece and integral with the housing (43).

Clause 6. The slide (1) according to clause 4, wherein the at least one elastic tab (44) is part of an attachment piece (45) enabling detachment of the housing (43).

Clause 7. The slide (1) according to clause 6, wherein the attachment piece (45) comprises a receiving portion (C45) for the housing (43), the at least one elastic tab (44) extending from the receiving portion (C45).

Clause 8. The slide (1) according to one of clauses 4 to 7, wherein the spring member (42) comprises two elastic tabs (44), in particular identical, extending one on either side of the housing (43), and in particular symmetrically with respect to the housing (43).

Clause 9. The slide (1) according to one of clauses 4 to 8, wherein at least one attachment tab (44), in particular each attachment tab (44), has a substantially planar attachment portion (F44) abutting against the vertical side wall (31) of the male rail (3).

Clause 10. The slide (1) according to clause 9, wherein at least one attachment tab (44), in particular each attachment tab (44), has a fold (P44) interposed between the attachment portion (F44) and the housing (43), and distanced from the vertical side wall (31) of the male rail (3) substantially in the transverse direction (Y) of the slide (1).

Clause 11. The slide (1) according to one of clauses 1 to 10, wherein the substantially planar wall (31) of the male rail (3) has a through-opening (32), at least partially receiving the means for measuring the magnetic field (41) which protrudes towards the vertical side wall (21) of the female rail (2) from the vertical side wall (31) of the male rail (3).

Clause 12. The slide (1) according to clause 11, wherein the vertical side wall (31) of the male rail (3) has an outer face (E31) oriented towards the vertical side wall (21) of the female rail (2), substantially in the transverse direction (Y) of the slide (1), and an inner face (I31) oriented away from the side wall (21) of the female rail (2), substantially in the transverse direction (Y) of the slide (1), the spring member (42) being fixed to the inner face (I31) of the vertical side wall (31) of the male rail (3).

Clause 13. The slide (1) according to clauses 1 to 12, wherein the vertical side wall (21) of the female section piece (2) is called the first vertical side wall (21), the female section piece (2) comprising a second vertical side wall (21') substantially parallel to the first vertical side wall (21), the first vertical side wall (21) and the second vertical side wall (21') surrounding the male section piece (3) in the transverse direction (Y) of the slide (1).

Clause 14. A vehicle seat (10) comprising:
a slide (1) according to one of clauses 1 to 13, and
a seating portion (11), the male section piece (3) of the slide (1) being connected to the seating portion (11) of the seat (10), the seating portion (11) having a central longitudinal axis (X1) passing substantially through the center of the seating portion (11) in the transverse direction (Y) of the slide (1).

Clause 15. The seat (10) according to clause 14 comprising a slide according to claim 11, wherein the first vertical side wall (21) of the female rail (2) is closer to the central longitudinal axis (X1) of the seating portion (11) of the seat (10) in the transverse direction (Y) of the slide (1) than the second vertical side wall (21') of the female rail (2).

The invention claimed is:
1. A slide for a vehicle seat, comprising:
a female rail having at least one substantially planar vertical side wall,
a male rail also having at least one substantially planar vertical side wall, mounted to slide relative to the female rail in the longitudinal direction of the slide, the female rail surrounding the male rail in a transverse direction relative to a length of the slide, with the vertical side wall of the female rail facing the vertical side wall of the male rail,
a position sensor configured to determine the position of the male rail relative to the female rail, at least in the longitudinal direction of the slide,
the position sensor comprising a means for measuring the surrounding magnetic field, the means for measuring fixed to the vertical side wall of the male rail and arranged between the substantially planar wall of the male rail and the substantially planar wall of the female rail and oriented towards the substantially planar wall of the female rail,
the means for measuring the magnetic field being fixed to the vertical side wall of the male rail by means of a spring member configured to urge the position of the means for measuring the magnetic field into engagement with the vertical side wall of the female rail in the transverse direction of the slide, in order to maintain a constant distance between the means for measuring the magnetic field and the vertical side wall of the female rail in the transverse direction of the slide.

2. The slide of claim 1, wherein the means for measuring the magnetic field is housed inside a housing that is integral with the spring member.

3. The slide of claim 2, wherein the spring member is configured to keep the housing pressed against the vertical side wall of the female rail, substantially in the transverse direction of the slide.

4. The slide of claim 2, wherein the spring member comprises at least one elastic tab extending from the housing, the at least one elastic tab being configured to urge the position of the housing towards the vertical side wall of the female rail in the transverse direction of the slide, in order to maintain a constant distance between the housing and the vertical side wall of the female rail in the transverse direction of the slide.

5. The slide of claim 4, wherein the at least one elastic tab is formed as one piece and integral with the housing.

6. The slide of claim 4, wherein the at least one elastic tab is part of an attachment piece enabling detachment of the housing.

7. The slide of claim 6, wherein the attachment piece comprises a receiving portion for the housing, the at least one elastic tab extending from the receiving portion.

8. The slide of claim 4, wherein the spring member comprises two elastic tabs, in particular identical, extending one on either side of the housing, and in particular symmetrically with respect to the housing.

9. The slide of claim 4, wherein at least one attachment tab, in particular each attachment tab, has a substantially planar attachment portion abutting against the vertical side wall of the male rail.

10. The slide of claim 9, wherein at least one attachment tab, in particular each attachment tab, has a fold interposed between the attachment portion and the housing, and distanced from the vertical side wall of the male rail substantially in the transverse direction of the slide.

11. The slide of claim 1, wherein the substantially planar wall of the male rail has a through-opening, at least partially receiving the means for measuring the magnetic field which protrudes towards the vertical side wall of the female rail from the vertical side wall of the male rail.

12. The slide of claim 11, wherein the vertical side wall of the male rail has an outer face oriented towards the vertical side wall of the female rail, substantially in the transverse direction of the slide, and an inner face oriented away from the side wall of the female rail, substantially in the transverse direction of the slide, the spring member being fixed to the inner face of the vertical side wall of the male rail.

13. The slide of claim 1, wherein the vertical side wall of the female rail is called the first vertical side wall, the female rail comprising a second vertical side wall substantially parallel to the first vertical side wall, the first vertical side wall and the second vertical side wall surrounding the male rail in the transverse direction of the slide.

14. A vehicle seat comprising:

a slide according to claim 1, and a seating portion, the male rail of the slide being connected to the seating portion of the seat, the seating portion having a central longitudinal axis passing substantially through the center of the seating portion in a direction parallel to the length of the slide.

15. A vehicle seat comprising:

a slide according to claim 11, and a seating portion, the male rail of the slide being connected to the seating portion of the seat, the seating portion having a central longitudinal axis passing substantially through the center of the seating portion in a direction parallel to the length of the slide, wherein the first vertical side wall of the female rail is closer to the central longitudinal axis of the seating portion of the seat in the transverse direction of the slide than the second vertical side wall of the female rail.

\* \* \* \* \*